United States Patent [19]

Hensleigh et al.

[11] 4,417,278
[45] Nov. 22, 1983

[54] TELEVISION RECEIVER SCRAMBLING SYSTEM

[76] Inventors: Robert H. Hensleigh, 8516 Harwood, Fort Worth, Tex. 76118; Charles M. Lacy, 5509 Dartmouth, Fort Worth, Tex. 76114; Hardy H. Walton, Jr., 8572 Harwood Rd. #299, Fort Worth, Tex. 76118

[21] Appl. No.: 275,500

[22] Filed: Jun. 19, 1981

[51] Int. Cl.³ .............................................. H04N 5/44
[52] U.S. Cl. .................................... 358/188; 358/245
[58] Field of Search ..................... 358/188, 194.1, 245; 455/1, 230, 352; 367/93, 94; 340/501, 541, 573, 715, 720

[56] References Cited

U.S. PATENT DOCUMENTS 3,863,196 1/1975 Hilles ..................................... 367/93
4,321,593 3/1982 Ho et al. .............................. 340/541

*Primary Examiner*—Richard Murray
*Attorney, Agent, or Firm*—Jim Peppers

[57] ABSTRACT

Discloses a proximity detection system mounted in combination with a TV receiver adapted to disrupt the programs of the receiver at the times when objects of at least the dimensions of children are positioned within a designated distance from the television picture. Detection system includes actuation means supplying electrical power to energize detection system. An acoustic pulse transducer means produces discrete periodic acoustic pulses into the viewing area and detects acoustic signals reflected back from the viewing area. A comparator means receives a signal corresponding to each of electrical pulses and echo signals and produces an actuating signal as a function of the distance between the transducer and target object. A receiver program disruption means operates to disrupt the TV program during such time when object is within a designated distance from the transducer. The actuation means may include a switch actuated by an RF tuned induction pickup coil and the signal disruption means radiates a disruption signal at a frequency of several KHz.

10 Claims, 3 Drawing Figures

TELEVISION RECEIVER SCRAMBLING SYSTEM

This invention generally relates to systems for scrambling television (TV) signals as received in a TV receiver and more particularly pertains to a system for scrambling the TV program when a person observing the program comes closer than a prescribed distance from the face of the TV picture tube.

BACKGROUND OF THE INVENTION

When persons watch TV programs, particularly children, there is sometimes a tendency for the persons to crowd up close to the face of the television tube. Such crowding sometimes continues despite admonitions for such young persons to remain a discrete distance away from the TV set while watching the program.

It is believed to be detrimental to the eyesight, particularly in developing children of pre-school age, for the children to watch the program while very near the TV screen.

Also, when several persons are watching a TV program, the tendency of younger persons, such as pre-school age children, to sit immediately in front of the television screen while watching the program blocks the view of the program from other persons who wish to observe the program from a greater distance.

Further, the television tubes of television receivers, particularly the high voltage color tube, eminate radiation through the television screen which can be harmful to human beings in some instances. There have been recommendations to parents and others for a minimum distance at which persons should watch a television program in order to remain safe from these eminated radiations.

While the television screens currently are presumed to be shielded against passing harmful radiation, the U.S. Government Agencies of: (1) The National Institute of Safety and Health, and (2) The Occupational Safety and Health Department can give current recommendations as to distances people should remain away from the TV set while viewing a program.

To solve the problem of persons observing TV programs from a too close range, some means to encourage or require such persons to remain a discrete distance away from the television screen needs to be provided.

OBJECTS OF THE INVENTION

A principle object of the present invention is to cause persons to be able to see a program only when remaining a designated distance away from a television screen.

Another object of the present invention is to prevent observers of a television program from observing a TV program from too close to the screen.

A still further object of the present invention is to ease any eye strain as may be caused by watching television programs from a too close range.

A still further object of the present invention is to provide a means by which any radiations eminating from a TV receiver are certain to have dissipated to a safe level before reaching an observer.

SUMMARY OF THE INVENTION

The foregoing and other objects and advantages of the invention are attained in a proximity detection system mounted in combination with a TV receiver adapted to disrupt the program of the receiver and at times when objects of at least the dimensions of children are positioned within a designated distance and a designated viewing area in front of the television picture. The detection system includes actuation means responsive to energization of the receiver for supplying electrical power to energize the detection system. An electrical pulse generator means produces discrete periodic high energy electrical pulses and an acoustic pulse transducer means responsive to the pulse generator means for producing discrete periodic acoustic pulses from the detection system into the viewing area and detects and converts the discrete acoustic signals reflected back from the viewing area into discrete electrical echo signals. A comparator means receives a signal respectively corresponding to each of said electrical pulses and said echo signals and produces an actuating signal as a function of the time between each electrical pulse and its corresponding echo signal with the time being a function of the distance between the transducer and an object such as a child which reflects back the acoustic signal. A receiver program disruption means receives the actuating signal and operates to disrupt the program during such time period as the actuating signal is within a range where the object is within a designated distance from the transducer. The period of the periodic high energy electrical pulses may be from about one to five seconds. The actuation means may include a swich actuated by an RF tuned induction pickup coil exposed to the electronics of the receiver. The signal disruption means is adapted to radiate a disruption signal at a frequency of several KHz into the circuits of the TV receiver.

DESCRIPTION OF A PREFERRED EMBODIMENT

Figure 1:
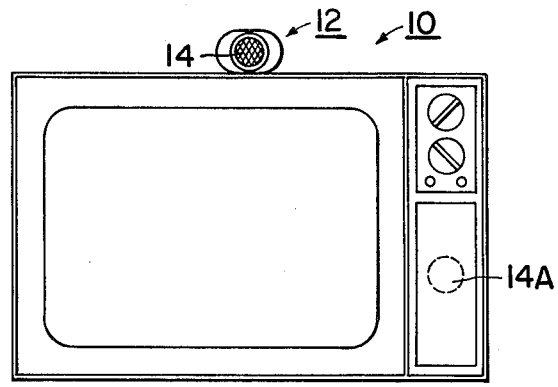
FIG. 1 is an illustrative front elevation of a television receiver having mounted thereon a typical proximity detector and scrambling system of the present invention.
Figure 2:
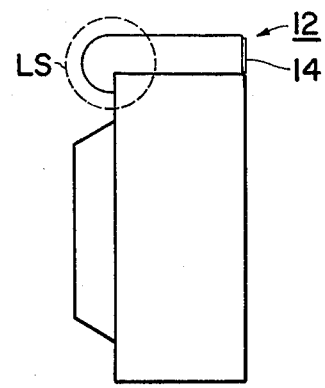
FIG. 2 is illustrative of a side elevation of the television set shown in FIG. 1 and also showing the installation of the proximity detection system.

Referring to FIGS. 1 and 2, there is shown a conventional TV receiver 10 on which is mounted a proximity detection device 12 which includes an acoustic pulse transducer 14 as shown.

The detector system 12 may be mounted on the top side of the TV receiver, as shown, or on another side as desired. For reasons later apparent, the detector 12 should be firmly mounted to the television receiver such that removal will be somewhat difficult.

It is also to be noted that the system housed within the detector 12 may be incorporated into the television receiver as part of the original equipment during manufacture if such is desired. The description of the system made herein will be as for "after-market" equipment.

As a device sold for installation with existing television receivers, the detector 12 may be housed in a integral cabinet as shown and mounted on any TV receiver with the pulse transducer 14 directed to produce acoustic pulses in the same direction as the face of the picture tube of the TV receiver 10.

Since the cabinets of many TV receivers are provided of metal, it is considered desirable for a portion of the housing for the detector 12 to extend away from the cabinet shell in an unshielded line of sight relation with the electronic components of the TV receiver.

Such portion of the housing which will contain the later described tuned induction coil and program signal disruption radiator antenna, is indicated at LS of the housing in FIG. 2.

Figure 3:
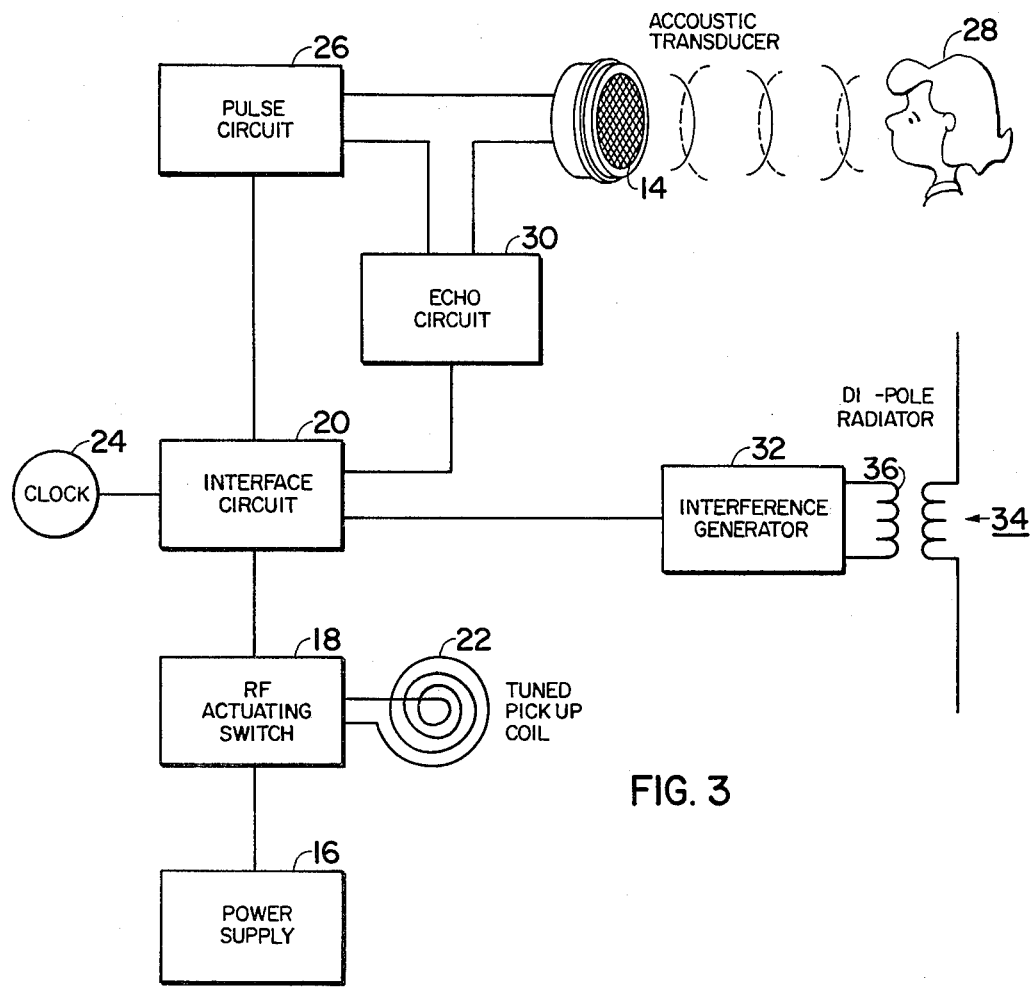
FIG. 3 is a schematic illustration of the detector and scrambling or disruption circuit of the present invention.

Referring now to FIG. 3, all the circuit components shown, including the acoustic transducer 14, are packaged and housed within the housing of the proximity detector 12 as shown in FIGS. 1 and 2.

In FIG. 3 there is shown a power supply 16 connected through an actuating switch 18 into an interface circuit 20.

An RF tuned pickup coil 22 is connected into the circuit of the actuating switch 18 which includes a tuned circuit having the pickup coil and a low power operational amplifier as a component (not shown). The tuned circuit will oscillate in concert with a radio frequency radiated from within the TV receiver system and produce sufficient voltage to close the switch 18. Such a tuned circuit is considered to be well known to those skilled in the art and to need no further description.

A clock circuit 24 is fed into, or is included in, the interface circuit 20 to provide an appropriate timing frequency for timing purposes as hereinafter described.

A pulse generator circuit 26 is powered from the interface circuit 20. The output of pulse circuit 26 is fed into the acoustic pulse transducer 14.

When actuated, the acoustic transducer 14 produces a directional acoustic pulse which, as seen with reference to FIGS. 1 and 2, is directed in the same direction as faced by the receiver picture tube.

The acoustic transducer 14 produces an electrical pulse corresponding to reflected or echoed acoustic pulses received back from any target 28 within the range and scope of the transducer 14. Such electrical echo pulse is fed into an echo circuit 30. The echo circuit 30 also receives a pulse signal corresponding to the power pulse transmitted from the pulse circuit 26 into the acoustic transducer 14.

The echo circuit produces an analog actuation signal corresponding to the successive time intervals between each respective pulse sent from the pulse circuit 26 and the pulse signal representing the acoustic echo received back into the transducer 14.

A switch responsive to the analog received from the echo circuit 30 provides power through interface circuit 20 to an interference generator 32 when the analog signal is corresponding to a designated time interval between the acoustic pulse and the acoustic echo caused by the target, a human being for example. The designated time interval is of course a function of the proximity between the face of the picture tube of TV receiver 10 and the target 28.

When actuated, the interference generator 32 produces a high frequency voltage, for example 20 KHz, which is transmitted into a dipole radiator 34 through a transformer element 36.

The energy output of the radiator 34 is radiated into all the circuit components of the TV receiver 10, and will cause disruption of either or both the audio and video outputs of the receiver.

IN OPERATION of the self-contained proximity detector 12 as shown in FIG. 3, the power supply 16 may be a 6 volt battery, for example. The actuating switch 18 may be tuned for the pickup coil 22 to pick up a radio frequency predominate in television receivers, for example, an IF frequency of 10.7 MHz.

The clock circuit may pulse at any frequency high enough to accurately time the speed of sound within about 0.5 feet, 2.2 KHz and above for example. A scaling circuit is included which responds to clock circuit 24 to actuate pulse circuit 26 every 3 seconds, for example, or more broadly about every 1 to 5 seconds. Each pulse of the pulse circuit 26 causes the acoustic transducer 14 to produce an acoustic pulse toward a potential target such as the typical target 28.

When a target 28, such as a human observer, is before the television receiver 10, the acoustic pulse is echoed back in part from target 28 into the transducer 28. This acoustic echo pulse causes transducer 14 to produce a corresponding electrical echo pulse.

The echo circuit 30 compares the time interval between the pulse from pulse circuit 26 with the echo pulse received from the transducer 14 and produces an analog signal corresponding to the time interval between such pulses. The time interval in turn corresponds to the distance between the transducer 14 and the target 28.

An actuating switch energizes the interference generator 32 through interface circuit 20 at such time as the analog signal corresponds to a minimum distance between the transducer 14 and the target 28.

When turned on, the interference generator 32 disrupts the picture and/or sound of the receiver 10 and continues to do so until the analog signal from the echo circuit 30 changes past a prescribed level corresponding to a minimum increased distance between the transducer 14 and the target 28.

Thus, a child, for example, who crowds up too close to the TV receiver to watch the program, will cause the TV receiver to become scrambled when he or she comes too close and the TV receiver will remain scrambled until the child moves out beyond the range prescribed for the detector 12.

An exemplary range for the target 28 to cause scrambling of the TV receiver is 6 feet. However, as later mentioned, the range may be set anywhere from 2 feet to 30 feet, for example.

With exception of the RF actuating switch 18, the interference generator 32 and its associated switch, all the remainder of the electrical components necessary to make up the circuit shown in FIG. 3 are available as an assembly kit, identified as a "Designers Kit", along with detailed instructions for its assembly and use, from: POLAROID CORPORATION, 1 Upland Road, Norwood, MA 02062, U.S.A.

The components of the Polaroid Designers Kit are capable of detecting the presence and distance of objects within a range of approximately 0.9 feet to 35 feet. In operation, a pulse is transmitted toward a target and the resulting echo is detected. The elapsed time between the initial acoustic pulse transmission and echo may be converted to distance with respect to the speed of sound. For a transmitted pulse to leave the transducer, strike a target 2 feet away, and return to the transducer, requires an average time lapse of 3.55 milliseconds.

A principle component in the Polaroid Designers Kit is the transducer which acts as both loudspeaker and microphone. The transducer has been designed to transmit the outgoing signal and also to function as an electrostatic microphone in order to receive and detect the echo signal. The diameter of the transducer determines the acoustical lobe pattern, or acceptance angle, during both the transmit and receive operation.

The Polaroid transducer includes a manufactured foil stretched over a grooved plate, forming the moving element which transforms electrical energy into sound waves and the returning echo back into electrical energy. The grooved metallic back plate in combination with the foil forms a capacitor which, when charged, exerts an electrostatic force to the foil. The foil is pliable, capable of resisting harsh environments and an excellent electrical conductor.

In the present invention, consideration should also be given to the use of the peizo-electric transducers now in use in industry as circular discs, cylinders, cones, and the like. Magneto-strictive or spark gap transducers may also be provided as transducer 14, as desired.

It is to be noted that the detector 12 may be incorporated into the TV receiver 10, either during or subsequent to the original manufacture and assembly of the receiver, and not be externally visible as indicated in FIGS. 1 and 2.

When detector 12 is to be incorporated into the TV receiver 10, the interface circuit may be switched on and receive power from within receiver 10 when the receiver is switched on.

The acoustic pulse transducer 14 usually may be installed with the audio speaker of the receiver such as shown in dashed line at 14A in FIG. 1.

The interference generator assembly 32-36 may be modified to disrupt internal circuits within the receiver 10 or substituted by some other means to disrupt the receiver 10 output responsive to the signal output of the echo circuit 30.

As will be apparent to those skilled in the art, the embodiment as herein disclosed may be considerably revised and modified, and all without departing from the invention and specified by the appended claims.

I claim:

1. A proximity detection system mounted in combination with a TV receiver and adapted to disrupt the program of the receiver at times when an object of at least the dimensions of a child is positioned within a designated distance and a designated viewing area in front of the television picture, said detection system comprising:

(a) means for supplying electrical power to energize said detection system;

(b) pulse generator means for producing discrete periodic high energy electrical pulses;

(c) combination acoustic pulse transducer means responsive to said pulse generator means for producing discrete periodic acoustic pulses into said viewing area, and for detecting and converting discrete acoustic signals reflected back from said viewing area into discrete electrical echo signals;

(d) comparator means for receiving a signal corresponding to each of said electrical pulses and said echo signals and producing an actuating signal as a function of the time between each pulse of said electrical pulses and its corresponding echo signal; and (e) receiver program disruption means for receiving said actuating signal and operating to produce a disruption signal of selected frequency and thereby to scramble said program during such time period as said actuating signal is within a range where said object is within a designated distance from said transducer.

2. The receiver of claim 1 wherein the period of said periodic high energy electrical pulses may be from about one to five seconds.

3. The receiver of claim 1 wherein said actuation means includes a switch actuated by an RF tuned induction pickup coil.

4. The receiver of claim 3 wherein said induction pickup coil is adapted to respond to an I.F. frequency in the range of about 10 to 12 MHz.

5. The receiver of claim 3 wherein said signal disruption means is adapted to radiate a disruption signal through an antenna means.

6. The receiver of claim 1 wherein said signal disruption means is adapted to radiate a disruption signal at a frequency of several KHz.

7. The receiver of claim 6 wherein the period of said periodic high energy electrical pulses may be from about one to five seconds.

8. The receiver of claim 1 wherein said signal disruption means is adapted to radiate a disruption signal through an antenna means.

9. The receiver of claim 8 wherein said signal disruption means is adapted to radiate a disruption signal at a frequency of several KHz.

10. The receiver of claim 1 wherein said electrical power is supplied from a battery.

* * * * *